United States Patent [19]

Torii et al.

[11] Patent Number: 5,060,533
[45] Date of Patent: Oct. 29, 1991

[54] ARM FITTING STRUCTURE OF HORIZONTAL ARTICULATED ROBOT

[75] Inventors: Nobotoshi Torii, Hachioji; Susumu Ito; Akira Tanaka, both of Yamanashi, all of Japan

[73] Assignee: Fanuc Ltd., Yamanashi, Japan

[21] Appl. No.: 457,777

[22] PCT Filed: May 17, 1989

[86] PCT No.: PCT/JP89/00498
§ 371 Date: Jan. 12, 1990
§ 102(e) Date: Jan. 12, 1990

[30] Foreign Application Priority Data

May 17, 1989 [JP] Japan .................. 63-118233

[51] Int. Cl.$^5$ .............. G05G 11/00; F16D 1/12; B25J 18/00
[52] U.S. Cl. ................... 74/479; 403/164; 403/165; 901/27; 901/28; 901/50
[58] Field of Search .................. 74/469, 479; 403/78, 403/164, 165, 336, 337; 901/27, 28, 50

[56] References Cited

U.S. PATENT DOCUMENTS 3,645,057 2/1972 Kaplan ........................ 403/164 X
4,583,909 4/1986 Yamashita et al. ............ 901/27 X

FOREIGN PATENT DOCUMENTS 58-90484 5/1983 Japan .
58-109284 6/1983 Japan .

Primary Examiner—Allan D. Herrmann
Assistant Examiner—David W. Laub
Attorney, Agent, or Firm—Armstrong, Nikaido, Marmelstein, Kubovcik & Murray

[57] ABSTRACT

A fitting structure of a first arm fitted to a robot base of a horizontal articulated robot, wherein a linearly movable slide is longitudinally guided along the robot base. A base at a base end of the first arm is rotatably fitted to the slider, and rotation of the base relative to the slider is restricted by a removable fixing device. This invention is efficiently used when packaging the robot.

3 Claims, 5 Drawing Sheets

ARM FITTING STRUCTURE OF HORIZONTAL ARTICULATED ROBOT

TECHNICAL FIELD

The present invention is directed to an improved arm fitting structure of a horizontal articulated robot, to realize a desired packaging of the robot, and is particularly effective for a large horizontal articulated robot.

BACKGROUND ART

As shown in FIGS. 7A and 7B, a conventional horizontal articulated robot comprises a robot base 1 along which a slider 6, moves vertically, and a base 2' located at a base end of a first arm 3' is fixed to the slider 6'. For packaging, a stopper $S_1$ is arranged between the base 2' and the first arm 3', and the first arm is horizontally folded. Also a stopper $S_2$ is disposed between the first arm and a second arm 4, and the second arm 4 is horizontally folded. Then, while ensuring that the second arm 4 does not touch the robot base 1, the arms are folded to reduce the robot to as small a shape as possible.

Therefore, as apparent from FIG. 7B, when folding the arms for packaging, the first arm 3' with an arm length $L_3$ is pivoted and folded around a point $O_3$ on the base 2', and the second arm 4 with an arm length $L_4$ is pivoted and folded around a journal point $O_4$ on the first arm. Therefore, no matter how the arms 3 and 4 are folded, a shape thereof as seen from the top of the robot will have large projections due to the arm lengths $L_3$ and $L_4$.

DISCLOSURE OF THE INVENTION

For example, as shown in FIGS. 2 and 3, in a known LM guiding means (a linear motion guiding apparatus) a slider 6 moves vertically along a robot base, an engaging cylinder 23 of a base 2 disposed at a base end of a first arm 3 is inserted to an engaging hole 63 of the slider 6 in such a manner that the base 2 is rotatable relative to the slider 6. Then the base 2 and slider 6 are fastened to each other by fastening bolts $B_1$.

Upon packaging, as shown in FIGS. 5 and 6, the slider 6 is raised, and the fastening bolts $B_1$ are removed so that the base 2 can freely rotate relative to the slider 6. Then by rotating the base 2, the whole of the arm is turned by 90° on the surface of the slider 6, and the whole arm is folded vertically along the robot base 1. Accordingly, the whole robot can be folded to a compact size and shape.

Also, when packaging, the whole of the arm can be hung down along a vertical axis so that the package volume is further reduced.

Since the structure fitting the arm to the slider is rotatable, the arm may be set to an optimum configuration for robot operation and packaging.

BEST MODE OF CARRYING OUT THE INVENTION

Figure 4:
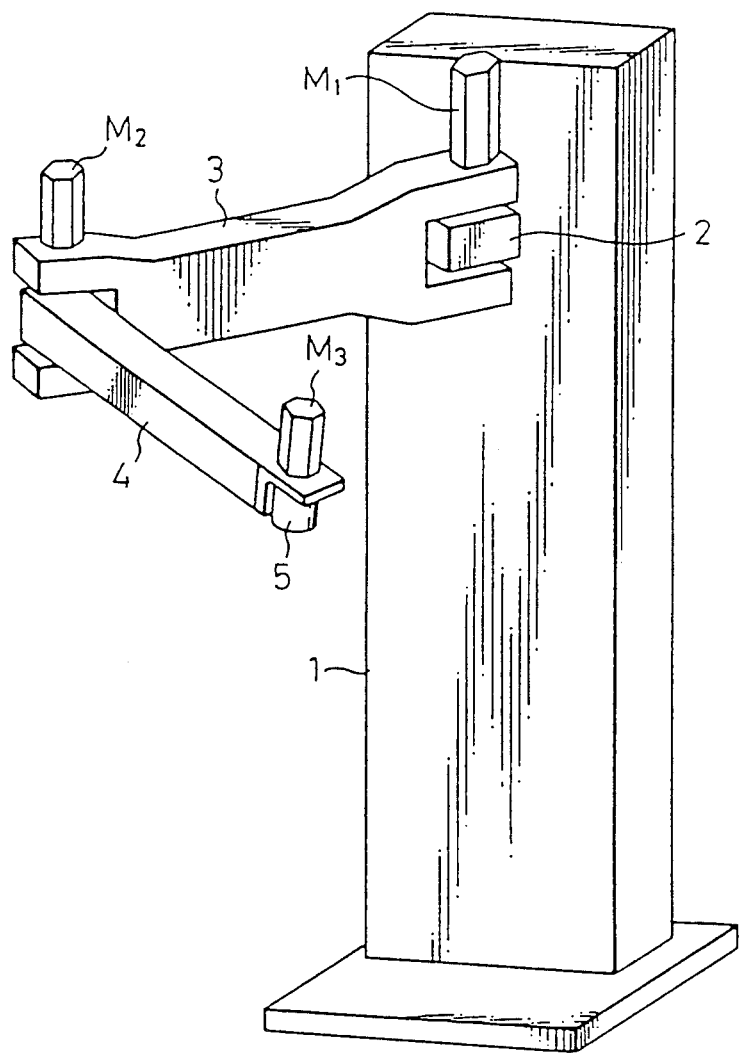
FIG. 4 is a general perspective view showing an operative state of the robot of the present invention.

As schematically shown in FIG. 4, a base 2 of an arm is fitted to a robot base 1 (an axis Z) through a slider, in such a manner that the base 2 is controlled and moved vertically. The base 2 is provided with a first arm 3, and this first arm 3 is horizontally controlled and rotated by a motor $M_1$. A second arm 4 is fitted to a front end of the first arm 3, through a motor $M_2$, in such a manner than the second arm 4 can be horizontally controlled and rotated. A wrist 5 is controllably and operably fitted to a front end of the second arm 4 through a motor $M_3$. The horizontal articulated robot thus formed is known, and the present invention is intended to improve a structure for fitting the first arm 3.

Figure 1:
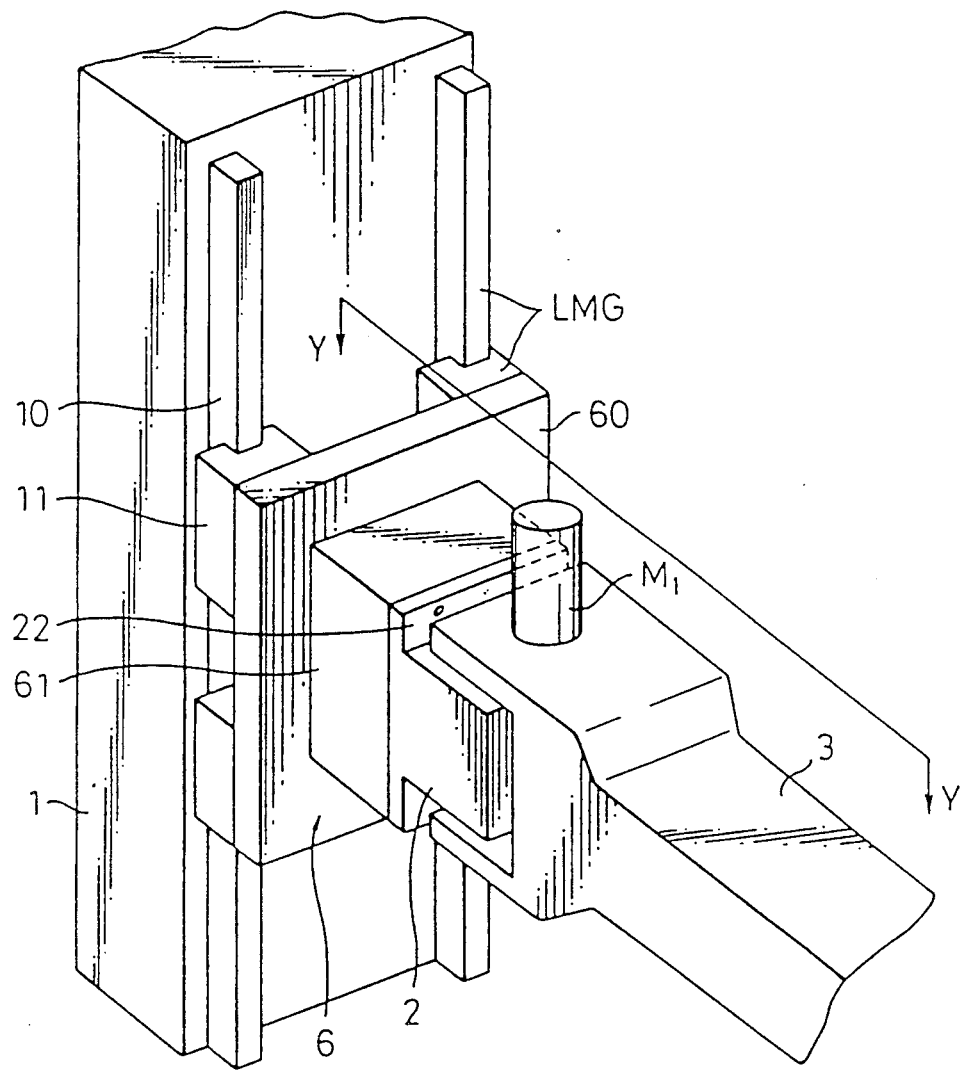
FIG. 1 is a perspective view showing essential parts of the present invention.
Figure 2:
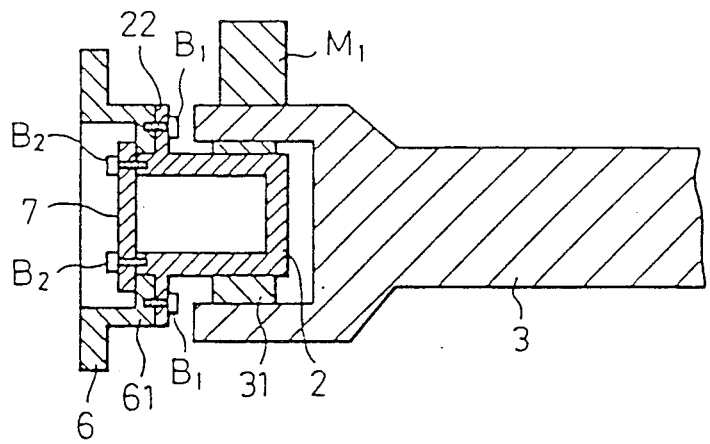
FIG. 2 is a sectional view taken along a line Y—Y of FIG. 1.
Figure 3:
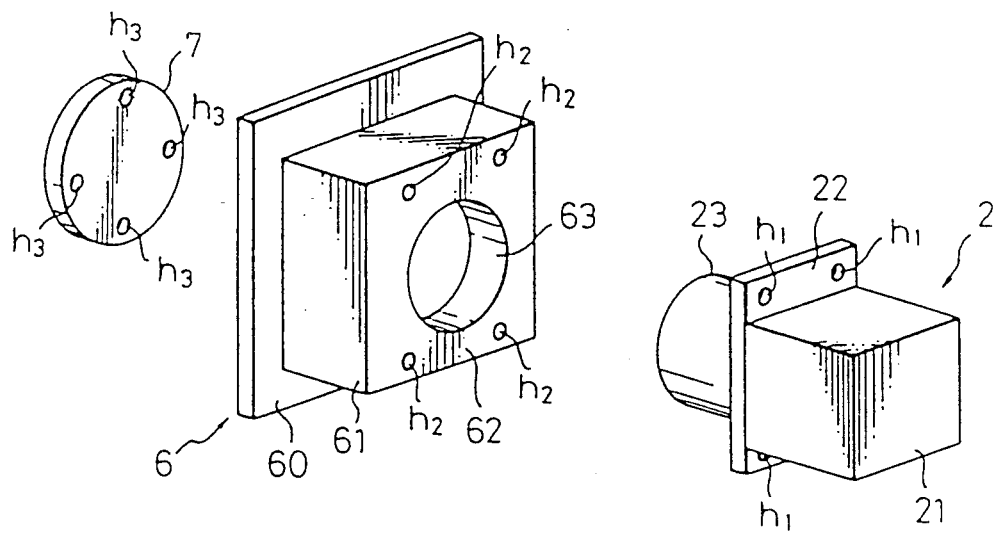
FIG. 3 is an exploded perspective view showing a base fitting portion of a robot arm of the present invention.

Namely, as shown in FIGS. 1, 2 and 3, the slider 6 comprises a fitting base plate 60 from which a square pipe portion 61 protrudes, and a square pipe front end plate 62 thereof is provided with a central engaging hole 63. Reference $h_2$ represents a screw hole.

The base 2 comprises a square pipe 21 for supporting the first arm 3, a flange 22 to be fitted to the slider front end plate 62, and an engaging cylinder 23 protruding from the flange 22; these components being formed integrally as one body. The flange 22 is provided with four bolt holes $h_1$, and a front end of the engaging cylinder 23 is provided with four screw holes (not shown) at equidistant intervals.

Numeral 7 denotes a circular plate having a diameter larger than that of the engaging hole 63. The circular plate 7 is provided with four bolt holes $h_3$ matching the screw holes formed at the front end of the engaging cylinder 23.

Upon assembly, the engaging cylinder 23 of the base 2 is inserted into the engaging hole 63 from the front end plate 62 side of the slider 6, and the plate 7 is attached to the front end of the engaging cylinder 23 inside the square pipe portion 61 of the slider 6, by bolts $B_2$ passed through the bolt holes $h_3$ from the plate 7 side and screwed into the screw holes formed on the front end of the cylinder 23. Bolts $B_1$ are passed through the bolt holes $h_1$ of the flange of the base 2 and screwed into the screw holes $h_2$ of the front end plate 62 of the slider 6.

The first arm 3 is fitted to the base 2 and the slider 6 is fitted to the robot base 1 through an LM guide (a linear motion guiding apparatus) LMG comprising a guide piece 11 and rails 10, by known techniques.

A large horizontal articulated robot with the first arm fitting structure shown in FIGS. 1, 2 and 4 can perform a set control operation in the same way as a conventional robot, without problems.

Figure 5:
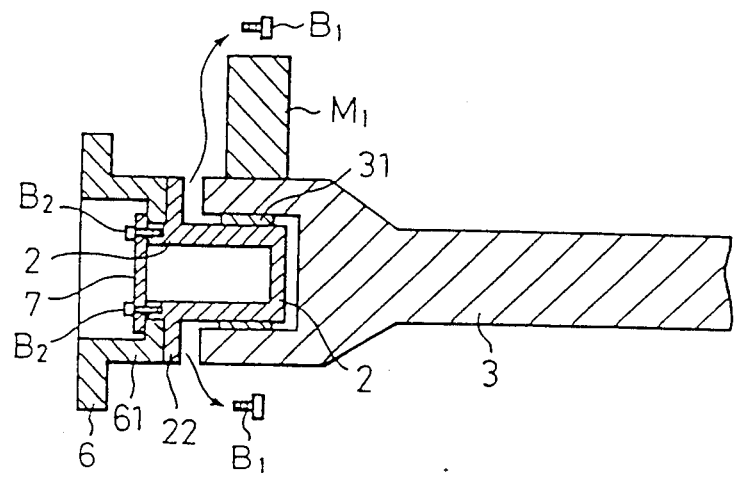
FIG. 5 is a view showing a rotational state of a base portion of FIG. 2.
Figure 6:
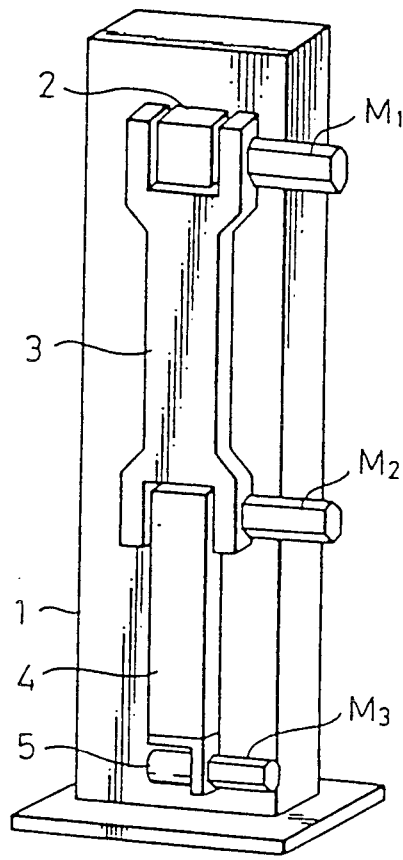
FIG. 6 is a general perspective view showing a packaging state of the robot of the present invention.
Figure 7A:
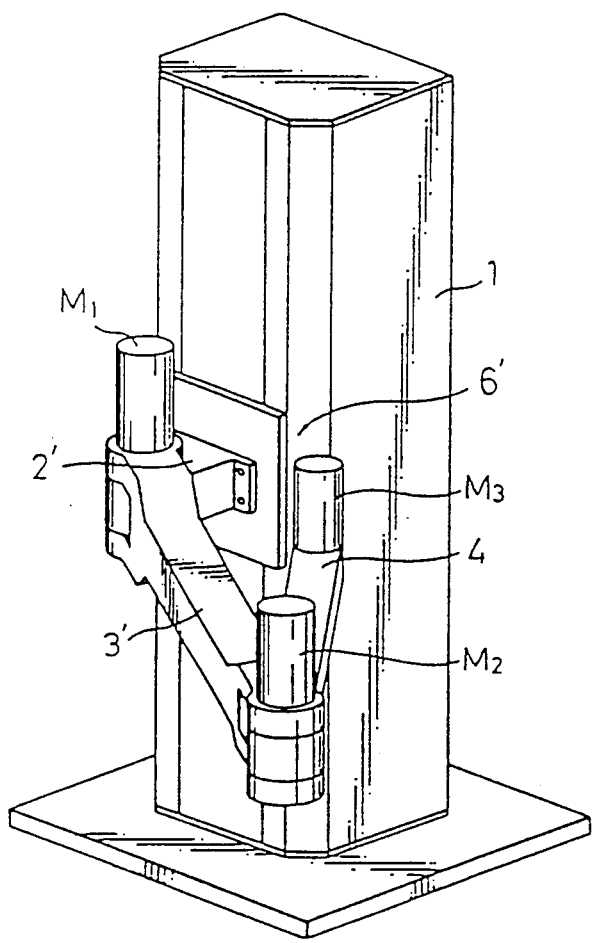
FIG. 7A is a general perspective view showing a packaging state of a robot according to a prior art.
Figure 7B:
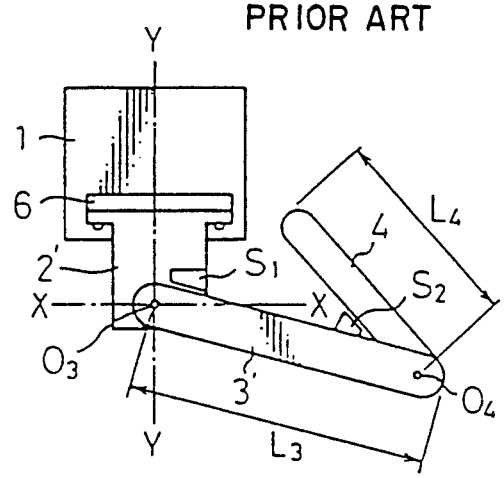
FIG. 7B is a top view of FIG. 7A.

When packaging the thus-obtained robot, the slider 6 is raised, and the bolts $B_1$ are removed as shown in FIG. 5 to release the flange 22 of the base 2 from the slider front end plate 62. While preventing a detaching of the base 2 from escaping from the slider 6, the plate 7 is slid on an inner surface of the slider front end plate 62 and the flange 22 is slid on an outer surface of the slider front end plate 62, so that the base can be turned by twisting the first arm 3. The first arm 3 is twisted by 90°, and is vertically folded around a shaft 31 as shown in FIG. 6. As apparent from FIG. 6, in a packaging configuration, all of the arms hang down along the robot base 1, thus remarkably reducing the packaging volume compared with a conventional configuration (refer to FIGS. 7A and 7B) and greatly reducing packaging and transporting costs.

As the means for restricting the rotation of the base 2 relative to the slider 6, the bolts $B_1$ mentioned above can be replaced by, for example, a fixing plate (not shown) attached to the base and slider from the outside and fixed by fastening bolts (not shown). Alternatively, the square pipe portion 61 of the slider 6 are provided with a cylindrical surface portion and folded projections of the flange portion 22 of the base 2 extend over the cylindrical surface portion, and then the folded projections and cylindrical surface portion are removably fixed to each other by fastening bolts. It is clear that the object of the present invention is also achieved with this arrangement.

According to the embodiment, the base 2 can rotate around an axis perpendicular to a plane of the slider 6, and thus the base 2 is rotated from an initial stop position shown in FIG. 1 around the above-mentioned axis by 90° and then stopped with respect to the slider 6. Namely, as shown in FIG. 3, the bolt holes $h_1$ and screw holes $h_2$ are disposed at regular angles on a circle having a predetermined radius around an axis perpendicular to the plane of the slider 6. When packaging, as shown in FIG. 6, the base 2 is rotated by 90° and fixed by the bolts $B_1$, to advantageously stop the rotation thereof.

While the invention has been particularly shown and described in reference to preferred embodiments thereof, it will be understood by those skilled in the art that changes in form and details maybe made therein without departing from the spirit and scope of the invention.

We claim:

1. An arm fitting structure of a horizontal articulated robot, comprising:
   a vertically moving robot base;
   a linearly movable slider guided longitudinally along the robot base up to an upper portion thereof;
   a first arm having a base end provided with a base rotatably fitted to the slider; and
   removable stopping means for restricting a rotation of the base relative to the slider, the robot base having a length which is the same as that of both first arm and second arm when linearly extended.

2. An arm fitting structure according to claim 1, wherein the base is fixed to the slider by screw bolts to thereby have the base rotatably move against the slider and not separate therefrom due to a plate when the bolts are loosened.

3. An arm fitting structure according to claim 2, wherein the base can be rotated around an axis thereof by 90° from an initial stop position and stopped relative to the slider.

* * * * *

UNITED STATES PATENT AND TRADEMARK OFFICE
CERTIFICATE OF CORRECTION

PATENT NO. : 5,060,533
DATED : October 29, 1991
INVENTOR(S) : Torii et al

It is certified that error appears in the above-identified patent and that said Letters Patent is hereby corrected as shown below:

On the cover page, Item [75] Nobotoshi Torii, Hachioji; Susumu Ito; Akira Tanaka, both of Yamanashi, all of Japan" should read --Nobutoshi Torii, Hachioji; Susumu Ito; Akira Tanaka, both of Yamanashi, all of Japan--.

Signed and Sealed this

Sixth Day of April, 1993

*Attest:*

STEPHEN G. KUNIN

*Attesting Officer*    Acting Commissioner of Patents and Trademarks